United States Patent [19]
Vijayrao et al.

[11] Patent Number: 6,058,403
[45] Date of Patent: May 2, 2000

[54] BROKEN STACK PRIORITY ENCODER

[75] Inventors: Narsing K. Vijayrao, Santa Clara; Sudarshan Kumar, Fremont, both of Calif.

[73] Assignee: Intel Corporation, Santa Clara, Calif.

[21] Appl. No.: 09/130,379

[22] Filed: Aug. 6, 1998

[51] Int. Cl.[7] .................................................. G06F 7/00
[52] U.S. Cl. ............................................................ 708/211
[58] Field of Search ..................................... 708/211, 205

[56] References Cited

U.S. PATENT DOCUMENTS

| | | | |
|---|---|---|---|
| 4,924,421 | 5/1990 | Seguchi | 708/211 |
| 5,241,490 | 8/1993 | Poon | 708/211 |
| 5,321,640 | 6/1994 | Anderson et al. | 708/211 |
| 5,511,222 | 4/1996 | Shiba et al. | 708/211 |

*Primary Examiner*—Tan V. Mai
*Attorney, Agent, or Firm*—Seth Z. Kalson

[57] ABSTRACT

A broken stack domino priority encoder to provide a set of voltages to uniquely identify the position of a leading one or leading zero in a binary word, the domino priority encoder comprising a by-pass stack of nMOSFETs and a broken stack of nMOSFETs to discharge various nodes. The stack depth of nMOSFETs between each node and ground is minimized in order to maximize switching speed of the priority encoder.

28 Claims, 2 Drawing Sheets

BROKEN STACK PRIORITY ENCODER

FIELD

The present invention relates to circuits, and more particularly, to priority encoder circuits.

BACKGROUND

Priority encoders provide signals indicative of the leading one ("1") or zero ("0") in a binary word. Usually, a priority encoder will have as many output lines as the length or number of bits in a binary word, and the voltages on the output lines indicate the leading one or zero in the binary word. For example, a priority encoder to indicate the leading one in an 8-bit word may have eight output lines in which at most one output line has a HIGH voltage (the others are at a LOW voltage), where the one output line with a HIGH voltage indicates the position of the leading one.

Within a priority encoder circuit, there may be one or more groups (or stacks) of serially connected transistors which bring various nodes to a LOW (ground) voltage, depending upon the bit values of the word. To discharge (or pull down) a node to LOW, a transistor stack provides a conducting path between the node and ground. An output circuit coupled to these nodes may then provide the necessary signals indicating the leading zero or one in the word.

In a domino (or dynamic) type priority encoder circuit, the nodes are charged (or pulled up) to a HIGH voltage during a pre-charge state or phase of a clock signal, and as then some or all of the nodes are discharged by various transistor stacks during an evaluation state or phase of the clock signal. The speed at which a domino priority encoder can operate may be limited by the speed at which the various nodes can be discharged. For a given technology, this speed may be increased (i.e., discharge time is decreased) if the stack depths of the transistors (i.e., the number of serially connected transistors in a conducting path between a node and ground) are reduced. For a static type priority encoder circuit, it also may be desirable to reduce the stack depths to increase speed. Also, for CMOS (Complementary Metal Oxide Semiconductor) technology, reducing stack depths may be desirable due to the so-called body effect.

Therefore, it is desirable to reduce the transistor stack depths in priority encoder circuits.

DETAILED DESCRIPTION OF EMBODIMENTS

We begin with terminology. The two-element Boolean algebra is relevant to switching circuits. For any point in a circuit, the term LOW will denote a set of voltages that map into one of the two Boolean elements, and the term HIGH will denote a set of voltages that map into the other of the two Boolean elements. The particular range of voltages that map into the Boolean elements depends upon the technology used, and may be different for different parts of a single circuit. To avoid dealing with set terminology, we shall say that a voltage is LOW (HIGH) if it belongs to the set LOW (HIGH). We also follow the convention that for any given node within a circuit, LOW voltages are less than HIGH voltages.

For the particular embodiments described herein, we shall incur a slight (but usual) abuse of notation by allowing the terms HIGH and LOW, which have been defined as voltages, to do double duty, so that HIGH and LOW also represent the two Boolean elements of the two-element Boolean algebra. It will be clear from context when HIGH or LOW represent a voltage or a Boolean element. It is customary to identify HIGH with the identity element for the binary Boolean operation AND and to identify LOW with the identity element for the binary Boolean operation OR, and this custom is followed here. Such an identification is pedagogically useful, but arbitrary, and it should be appreciated that the present invention is not limited by this particular identification of voltages with Boolean elements.

Let an 8-bit word W be expressed as $(B_7 B_6 \ldots B_0)$ where $B_i$ is the $i^{th}$ bit of word W. $B_7$ and $B_0$ are, respectively, the most significant bit and the least significant bit of word W. We incur another slight abuse of notation and let $B_i$ also denote a voltage and Boolean element, and without loss of generality we take $B_i$ to be HIGH if the $i^{th}$ bit of word W is 1 and to be LOW if the $i^{th}$ bit of word W is 0. The term "word" is not to be confused with the wordlength of a computer system. Here, a word simply refers to a binary tuple.

Figure 1:
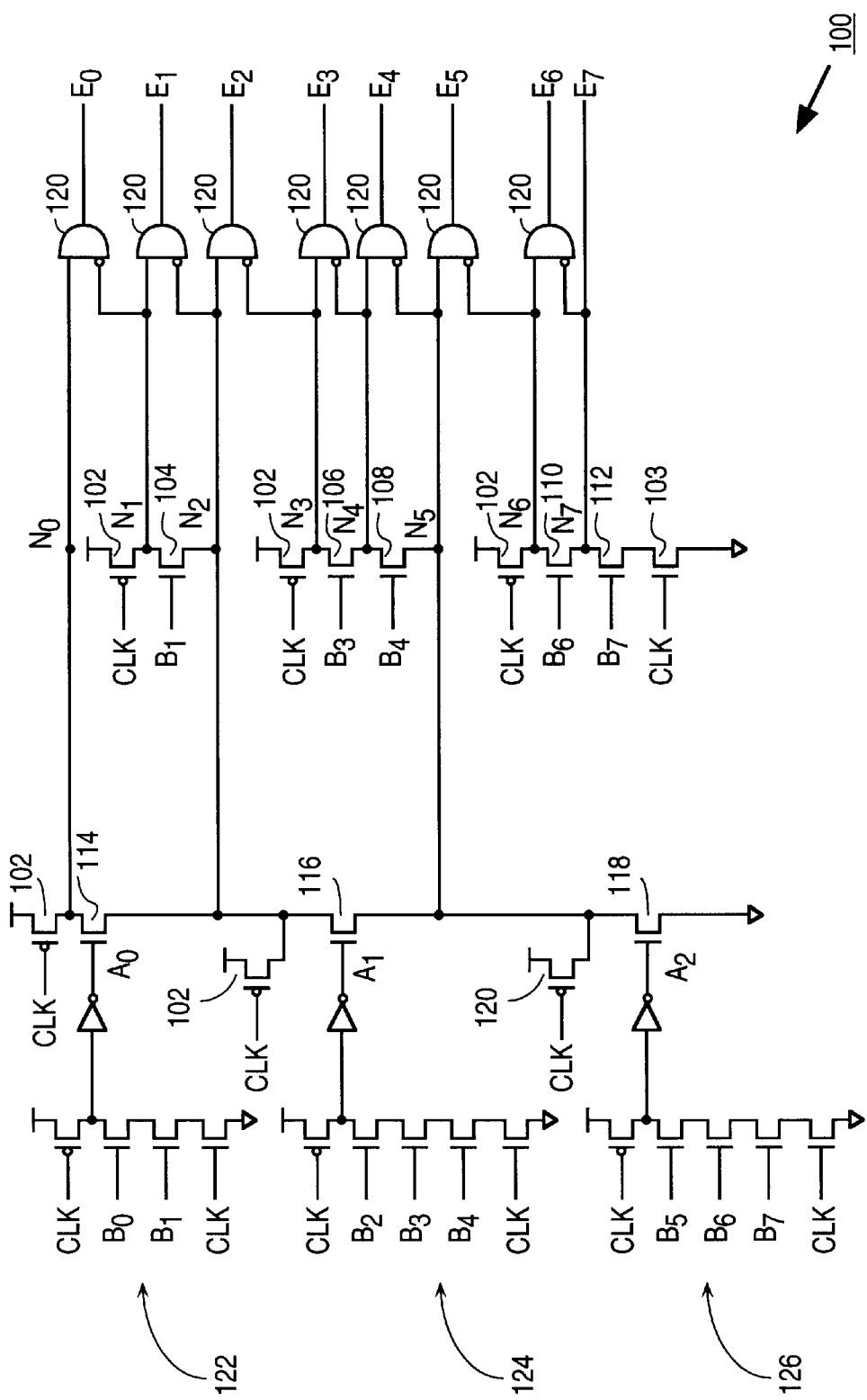
FIG. 1 is an embodiment of a dynamic type broken stack priority encoder.

Shown in FIG. 1 is an embodiment priority encoder 100 for word W. The output of FIG. 1 is the set $\{E_0, E_1, \ldots E_7\}$, where an $E_i$ represents either a voltage or a Boolean element, depending upon context. In FIG. 1, a set of values such that $E_i$=LOW for all i≠k and $E_k$=HIGH indicates that the leading zero of word W is the bit $B_k$. If $E_i$=LOW for all i, then word W has no leading zero, i.e., all the bits for W are ones.

In FIG. 1, $A_0$, $A_1$, and $A_2$ represent voltages or Boolean elements, depending upon context. As voltages, they represent gate voltages for nMOSFETs (n-Metal Oxide Semiconductor Field Effect Transistor) 114, 116, and 118, respectively. When considered as Boolean elements, $A_0$, $A_1$, and $A_2$ are given by the Boolean expressions $$A_0 = B_0 \cdot B_1$$

$$A_1 = B_2 \cdot B_3 \cdot B_4$$

$$A_2 = B_5 \cdot B_6 \cdot B_7$$

where · denotes logical (Boolean) AND. In FIG. 1, domino gates 122, 124, and 126 are used to provide $A_0$, $A_1$, and $A_2$, although other types of logic gates may be employed.

A set of 8 nodes $\{N_0, N_1, \ldots N_7\}$ is labeled in FIG. 1. In addition to being a label, the symbol $N_i$ is also used to indicate the voltage or Boolean value of node $N_i$, depending upon context. When clock signal CLK is LOW ($V_{ss}$ or ground), pMOSFETs 102 are ON and nMOSFET 103 is OFF, so that all nodes are charged (pulled up) to HIGH ($V_{cc}$). This is the pre-charge state (phase). The evaluation state (phase) is characterized by CLK being HIGH. During an evaluation phase, pMOSFETs 102 are OFF and nMOSFET 103 is ON, causing some of the nodes to be pulled down to LOW depending upon the values for $B_i$, i=0, 1, . . . 7.

The gates of nMOSFETs 104, 106, 108, 110, and 112 are at voltages $B_i$, i=1, 3, 4, 6, and 7, respectively, and the gates of nMOSFETs 114, 116, and 118 are at voltages $A_i$, i=0, 1, and 2, respectively. During an evaluation phase, it can be seen from FIG. 1 that the value for node $N_i$ expressed in terms of the bit values $B_i$, i=0, 1, . . . 7, is given by $$N_i = \overline{\prod_{j=i}^{7} B_j}$$

where the over-bar denotes Boolean complement and the product indicates the Boolean AND operation.

The above expression assumes that a node, if not discharged to ground via a conducting path of transistors, will hold its charge during the evaluation phase. This assumption depends upon the capacitance of a node and the switching frequency of CLK. If needed, in some embodiments half-keepers may be employed at the nodes to keep them charged HIGH if they are not discharged to ground potential via a conducting path of transistors.

Note that in FIG. 1 the path from any node to ground (not counting nMOSFET 103) is only three transistors. It is desirable to keep these paths as small as possible because the discharge time for any node is dependent upon the number of serially connected transistors discharging the node to ground. In a sense, the stack of transistors 104, 106, 108, 110, and 112 is "broken" at nodes $N_i$, i=0, 2, and 5, so that some or all of transistors 114, 116, and 118 provide a bypass path between these nodes and ground. Hence the name "broken stack" priority encoder.

The outputs $E_i$, i=0, 1, . . . 6, are indicative of the node voltages via logic gates 120. In terms of node Boolean values, the values for $E_i$ are given by $$E_i = N_i \cdot \overline{N_{i+1}}, \quad i \neq 7,$$

$$E_7 = N_7.$$

In terms of the Boolean or bit inputs $(B_7 \, B_6 \, \ldots \, B_0)$, the $E_i$ are given by $$E_i = \overline{\prod_{k=i}^{7} B_k} \cdot \prod_{k=i+1}^{7} B_k, \quad i \neq 7,$$

$$E_7 = \overline{B_7}.$$

The above two Boolean expressions are equivalent to the statement that $E_k$=HIGH if and only if $B_k$=LOW and $B_{k+1}$, $B_{k+2}$, . . . $B_7$, are all HIGH. Therefore, the embodiment of FIG. 1 is seen to be a priority encoder.

An entire class of embodiments for any word W of arbitrary word length N+1, denoted by $(B_N \, B_{N-1} \, \ldots \, B_0)$, may be described as follows. Choose a set I of K+1 integers I={$n_0, n_1, \ldots n_K$} with $n_i \geq 1$ such that $$\sum_{k=0}^{K} n_k = N + 1.$$

Define the K+2 sums $S_k$, k=0, 1, . . . K+1, as $$S_k = \sum_{j=0}^{k-1} n_j, \quad k > 0,$$

$$S_0 = 0.$$

Note that $S_{K+1}$=N+1.

Partition the set of ordered integers {0, 1, . . . N} into K+1 disjoint sets $I_k$, k=0, 1, . . . K, of ordered integers where $$I_k = \{S_k, (S_k+1), \ldots (S_{k+1}-1)\}.$$

Note that the number of elements in the set $I_k$ is $n_k$. Label the elements in $I_k$, from left to right, as $I_k[i]$, i=0, 1, . . . ($n_k$-1). Define a set of K+1 values (Boolean or voltage) {$A_0, A_1, \ldots A_K$} where $$A_k = \prod_{i \in I_k} B_i.$$

Note that $A_k$ is the logical AND of $n_k$ terms.

Using the above formalism, an embodiment can now be described as follows for any chosen integer set I. There are N+1 nodes {$N_0, N_1, \ldots N_N$}, a by-pass stack of K+1 nMOSFETs connected in series, and a broken stack of (N-K) nMOSFETs. The broken stack comprises K+1 groups $G_k$, k=0, 1 . . . K, of serially connected nMOSFETs. Group $G_k$ comprises $n_k$-1 serially connected nMOSFETs labeled as $G_k[i]$, i=1, 2, . . . ($n_k$-1). The gate voltage of nMOSFET $G_k[i]$ is $B_{I[k,i]}$, where to avoid subscripts with subscripts we have set I[k,i]=$I_k$[i]. (This last statement may perhaps be more easily visualized by noting that deleting bits $B_i$, i=$S_0, S_1, \ldots S_K$, from the word W=($B_N \, B_{N-1} \, \ldots \, B_0$) yields a vector whose values are the gate voltages of the nMOSFETs in the broken stack.) The drain of nMOSFET $G_k[i]$ is connected to (or defines) node $N_{I[k,i]}$. Label the K+1 nMOSFETs in the by-pass stack as H[k], k=0, 1, . . . K. The gate voltage of nMOSFET H[k] is $A_k$, the drain of nMOSFET H[k] defines node $N_{I[k,0]}$, and the source of nMOSFET H[k] is connected to the source of nMOSFET $G_k[n_k-1]$.

To continue the description of the above embodiment for the chosen integer set I, an pMOSFET is connected to each node and has a gate controlled by a clock signal CLK, and an nMOSFET is connected to the source of $G_K[n_K-1]$ and has a gate controlled by the clock signal CLK. There are N output circuits $C_i$, i=0, 1, . . . (N-1), each having an output voltage $E_i$, i=0, 1, . . . (N-1). Each output circuit $C_i$ has two inputs labeled as $C_i[0]$ and $C_i[1]$ having voltages $C_i[0]$ and $C_i[1]$, respectively. (Again, our notation is performing a double duty.) For any output circuit $C_i$, i=0, 1, . . . (N-1), its output voltage is given by $E_i$=$C_i[0] \cdot \overline{C_{i[1]}}$, input $C_i[0]$ is connected to node $N_i$, and input $C_i[1]$ is connected to node $N_{i+1}$. The embodiment also has an output voltage $E_N$ defined as the output voltage of node $N_N$.

In terms of the Boolean or bit inputs $(B_7 \, B_6 \, \ldots \, B_0)$, it can be shown that the $E_i$ are given by $$E_i = \overline{\prod_{k=i}^{N} B_k} \cdot \prod_{k=i+1}^{N} B_k, \quad i \neq N,$$

$$E_N = \overline{B_N}.$$

The above two Boolean expressions are equivalent to the statement that $E_k$=HIGH if and only if $B_k$=LOW and $B_{k+1}$, $B_{k+2}$, . . . $B_N$, are all HIGH. Therefore, the above formalism describes a priority encoder.

An optimum integer set can be defined as that integer set which minimizes a cost function. One particular cost function is the maximum stack depth of transistors connecting each node to ground, including the number of terms in each expression for $A_i$. For simplicity, we do not include any clocked transistors in the stack depth. Including in a cost function the number of terms in each Boolean expression for $A_i$ is warranted if these voltages are obtained by domino logic gates performing logical ANDs applied to the appropriate terms $B_i$, for then the number of such terms is indicative of the stack depth of such domino logic gates used to obtain $A_i$.

Such a cost function C(I) is obtained as follows. The stack depth for nodes $\{N_{J[k,i]}, i=1, 2, \ldots (n_k-1); k=0, 1, \ldots K\}$ is $(n_k-i+K-k)$. The stack depth for nodes $\{N_{J[k,0]}, k=0, 1, \ldots K\}$ is $(K+1-k)$. Note, however, that the maximum stack depth for the nodes $\{N_{J[k,0]}, k=0, 1, \ldots K\}$ is clearly K+1, the total number of nMOSFETs in the by-pass stack. The number of terms in the Boolean expression for $A_i$ is $n_i$. Thus, we can write a cost function as $$C(I) = \max\begin{bmatrix}(K+1), \{n_k, k=0, 1, \ldots K\},\\ \{(n_k-i+K-k), i=1, 2, \ldots (n_k-1); k=0, 1, \ldots K\}\end{bmatrix}.$$

Then, given N, a particular optimum integer set is a set $I=\{n_0, n_1, \ldots n_k\}$ with $n_i \geq 1$ $$\text{where} \quad \sum_{k=0}^{K} n_k = N+1 \quad \text{such that} \quad C(I) = \min_J C(J).$$

The above integer set is the so-called "min-max" solution. It can be verified that for a word length of 8 (i.e., N=7), the min-max integer set for the above cost criterion or function is unique and is I={2, 3, 3}, which is the integer set for the embodiment of FIG. 1.

Other cost functions may be chosen. For example, if the voltages $A_i$ are obtained by circuits in which the stack depths are relatively small, then the following cost function may be of utility:

$$C(I)=\max[(K+1), \{(n_k-i+K-k), i=1, 2, \ldots (n_k-1); k=0, 1, \ldots K\}].$$

Other cost functions may be based upon an average stack depth, rather than the maximum stack depth. The average may weight the stack depths according to a weighting factor if there is a priori information that some nodes are more likely to be discharged than others. The min-max approach may be the more conservative approach, but clearly many cost functions may be utilized.

It should be noted that if the integer set is chosen such that $n_i=1$ for all $i=0, 1, \ldots K$, then K=N, the resulting priority encoder degenerates to the case in which there is only one stack (one by-pass stack and no broken stack, excluding any stacks to obtain $A_i$), and the stack depth for node $N_0$ is N+1. Thus, for there to be a broken stack, there should be at least one integer $n_i$ in the integer set for which $n_i>1$.

Several priority encoder embodiments as described herein may be combined together into a single priority encoder for handling large word lengths. For example, for a 64-bit word, four priority encoders for N=7 as described herein may be used to encode eight 8-bit blocks of the 64-bit word in a parallel fashion. Relatively simple logic gates may be employed to indicate the leading one or zero of the 64-bit word based upon the outputs from the N=7 priority encoders.

Various modifications may be made to the above disclosed embodiments. For example, clocked nMOSFETs may not be needed if the gate voltages are obtained from other domino logic gates in which inverters are used between the domino logic gates and the priority encoder, for then all gate voltages will be LOW during the pre-charge phase. In this case, the source of the last transistor in the broken stack is connected to ground. On the other hand, if the voltages $A_i$ are not obtained via domino logic gates, then a clocked nMOSFET may be needed at the source of the last transistor in the by-pass stack.

It should be appreciated that the embodiments described above are of the domino (or dynamic) type, in that various nodes are pre-charged (pulled up) HIGH before possibly being discharged (pulled down) by stacks of serially connected transistors. However, other embodiments may include static type (dual-rail) circuits.

In the static case, the clocked transistors are not needed, and for each relevant node one or more pMOSFETs are connected in parallel to pull up the node HIGH when any of the pMOSFETs are ON. Whereas in the dynamic case all relevant nodes are pulled up HIGH during a pre-charge phase and a subset of the relevant nodes is pulled down LOW during an evaluation phase, in the static case all relevant nodes are either LOW or HIGH (after some settling or delay time interval) depending upon the current gate voltages of the various nMOSFETs and pMOSFETs. To avoid cumbersome terminology, we shall say that a stack of nMOSFETs pulls down a node LOW if the stack brings the node voltage from HIGH to LOW, or, if it keeps the node LOW if the node is already LOW. A similar statement applies to pMOSFETs that pull up (or keep) a node HIGH.

A static embodiment is easily obtained by modifying a dynamic embodiment as follows. Remove all clocked pMOSFETs and all clocked nMOSFETs from the dynamic embodiment, where transistor sources that were connected to a clocked nMOSFET are now connected to ground. For each $N_i$ connected to a transistor stack of depth n, add n pMOSFETs, each with a drain connected to $N_i$ and a source connected to a HIGH voltage source, where each pMOSFET belonging to the added pMOSFETs has a gate connected to one and only one of the gates of the nMOSFETs within the transistor stack for $N_i$.

Figure 2:
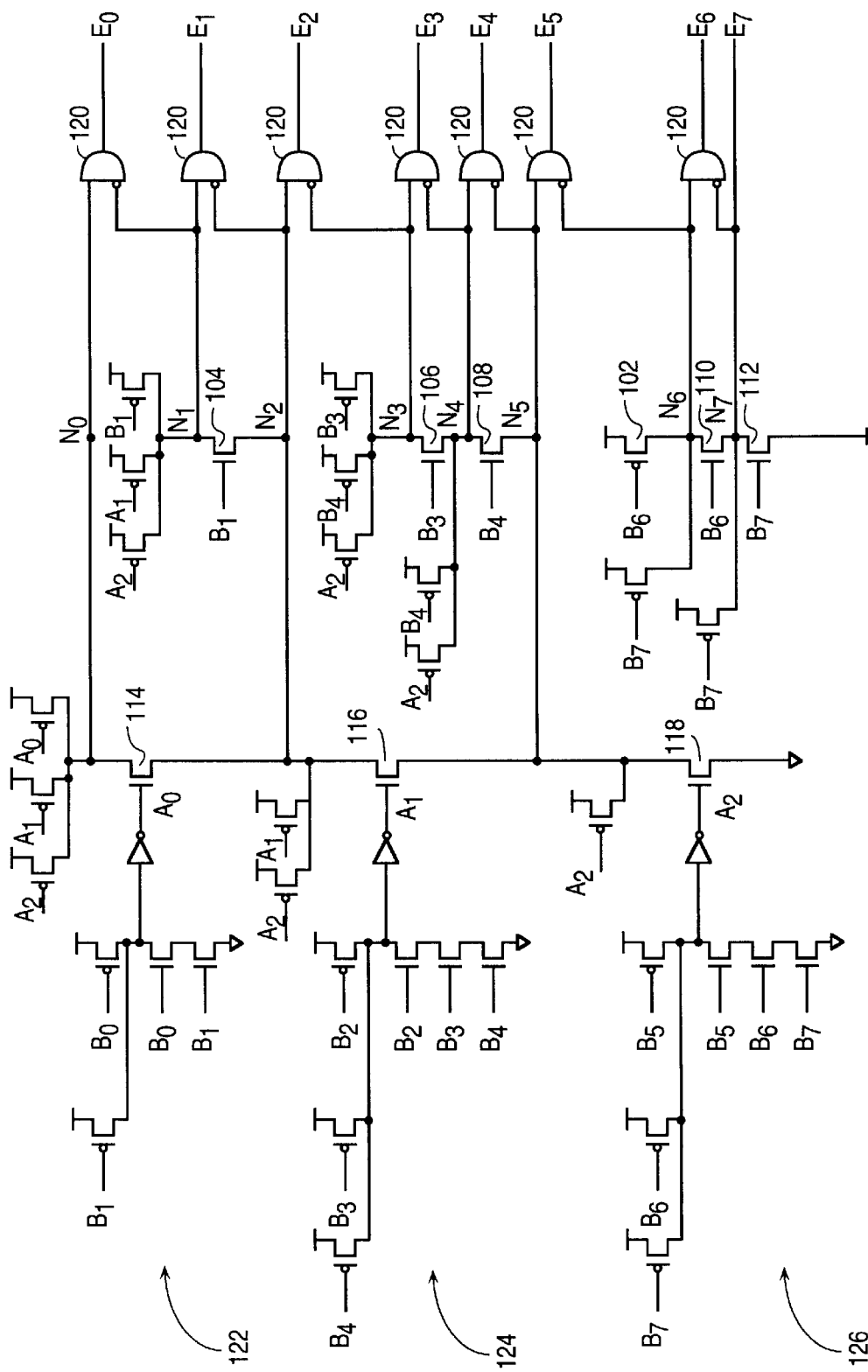
FIG. 2 is an embodiment of a static type broken stack priority encoder.

An example of a static priority encoder corresponding to the dynamic priority encoder of FIG. 1 is provided in FIG. 2, where corresponding elements in FIGS. 1 and 2 have the same label. FIG. 2 is similar to FIG. 1, except that the source of nMOSFET 112 is connected to ground, all clocked transistors are deleted, and pullup pMOSFETs have been added as explained above.

It should also be appreciated that other embodiments may include technology other than CMOS. For example, other types of IGFETs (Insulated Gate Field Effect Transistor), or FETs (Field Effect Transistors), may be employed instead of the nMOSFETs and pMOSFETs described above. More generally, other types of transistors, such as bipolar transistors, may be employed instead of the nMOSFETs and pMOSFETs.

In other embodiments, the outputs $E_i$ may be complemented, in which case a LOW output signal provides information indicative of the leading zero bit. Furthermore, any leading zero priority encoder is easily converted into a leading one priority encoder by complementing the word W. Therefore, the term priority encoder encompasses circuits which provide output signals indicative of either the leading one or leading zero of a word.

Consequently, it is clear that many modification may be made to the embodiments described herein without departing from the scope of the invention as claimed below.

What is claimed is:

1. A priority encoder comprising:
   a by-pass stack comprising first, second, and third nMOSFETs;
   a broken stack of nMOSFETs comprising first, second, and third groups, wherein:
     the first group comprises an nMOSFET having a source coupled to the source of the first nMOSFET in the by-pass stack;

the second group comprises first and second nMOSFETs serially coupled to each other, where the second nMOSFET in the second group has a source coupled to the source of the second nMOSFET in the by-pass stack; and the third group comprises first and second nMOSFETs serially coupled to each other, where the second nMOSFET in the third group has a source coupled to the source of the third nMOSFET in the by-pass stack.

2. The priority encoder as set forth in claim 1, further comprising:

an output circuit to provide at least one voltage indicative of the leading zero of a binary word ($B_7$ $B_6$ . . . $B_0$) if the gate voltage of the nMOSFET in the first group is indicative of $B_1$;

the gate voltage of the first nMOSFET in the second group is indicative of $B_3$;

the gate voltage of the second nMOSFET in the second group is indicative of $B_4$;

the gate voltage of the first nMOSFET in the third group is indicative of $B_6$;

the gate voltage of the second nMOSFET in the third group is indicative of $B_7$;

the gate voltage of the first nMOSFET in the by-pass stack is indicative of the Boolean expression $B_0 \bullet B_1$ where $\bullet$ denotes logical AND;

the gate voltage of the second nMOSFET in the by-pass stack is indicative of the Boolean expression $B_2 \bullet B_3 \bullet B_4$; and the gate voltage of the third nMOSFET in the by-pass stack is indicative of the Boolean expression $B_5 \bullet B_6 \bullet B_7$.

3. The priority encoder as set forth in claim 1, further comprising:

an output circuit to provide at least one voltage indicative of the leading one of a binary word ($B_7$ $B_6$ . . . $B_0$) if the gate voltage of the nMOSFET in the first group is indicative of $B_1$;

the gate voltage of the first nMOSFET in the second group is indicative of $B_3$;

the gate voltage of the second nMOSFET in the second group is indicative of $B_4$;

the gate voltage of the first nMOSFET in the third group is indicative of $B_6$;

the gate voltage of the second nMOSFET in the third group is indicative of $B_7$;

the gate voltage of the first nMOSFET in the by-pass stack is indicative of the Boolean expression $B_0 \bullet B_1$ where $\bullet$ denotes logical AND;

the gate voltage of the second nMOSFET in the by-pass stack is indicative of the Boolean expression $B_2 \bullet B_3 \bullet B_4$; and the gate voltage of the third nMOSFET in the by-pass stack is indicative of the Boolean expression $B_5 \bullet B_6 \bullet B_7$.

4. The priority encoder as set forth in claim 1, further comprising:

at least one clocked transistor to charge the drains of all said nMOSFETs to HIGH if a clock signal is in a first state, wherein, based upon gate voltages of all said nMOSFETs, a subset of the drains of all said nMOSFETs is discharged to LOW if the clock signal is in a second state complementary to the first state.

5. The priority encoder as set forth in claim 4, further comprising:

an output circuit to provide at least one voltage indicative of the leading zero of a binary word ($B_7$ $B_6$ . . . $B_0$) if the clock signal is in the second state;

the gate voltage of the nMOSFET in the first group is indicative of $B_1$;

the gate voltage of the first nMOSFET in the second group is indicative of $B_3$;

the gate voltage of the second nMOSFET in the second group is indicative of $B_4$;

the gate voltage of the first nMOSFET in the third group is indicative of $B_6$;

the gate voltage of the second nMOSFET in the third group is indicative of $B_7$;

the gate voltage of the first nMOSFET in the by-pass stack is indicative of the Boolean expression $B_0 \bullet B_1$ where $\bullet$ denotes logical AND;

the gate voltage of the second nMOSFET in the by-pass stack is indicative of the Boolean expression $B_2 \bullet B_3 \bullet B_4$; and the gate voltage of the third nMOSFET in the by-pass stack is indicative of the Boolean expression $B_5 \bullet B_6 \bullet B_7$.

6. The priority encoder as set forth in claim 4, further comprising:

an output circuit to provide at least one voltage indicative of the leading one of a binary word ($B_7$ $B_6$ . . . $B_0$) if the clock signal is in the second state;

the gate voltage of the nMOSFET in the first group is indicative of $B_1$;

the gate voltage of the first nMOSFET in the second group is indicative of $B_3$;

the gate voltage of the second nMOSFET in the second group is indicative of $B_4$;

the gate voltage of the first nMOSFET in the third group is indicative of $B_6$;

the gate voltage of the second nMOSFET in the third group is indicative of $B_7$;

the gate voltage of the first nMOSFET in the by-pass stack is indicative of the Boolean expression $B_0 \bullet B_1$ where $\bullet$ denotes logical AND;

the gate voltage of the second nMOSFET in the by-pass stack is indicative of the Boolean expression $B_2 \bullet B_3 \bullet B_4$; and the gate voltage of the third nMOSFET in the by-pass stack is indicative of the Boolean expression $B_5 \bullet B_6 \bullet B_7$.

7. A priority encoder comprising:

a set $\{N_0, N_1, \ldots N_N\}$ of N+1 nodes;

a by-pass stack of serially connected K+1 IGFETs H[k], k=0, 1, . . . K; and a broken stack of (N−K) IGFETs, the broken stack comprising K+1 groups $G_k$, k=0, 1 . . . K, of serially connected IGFETs, each group $G_k$ comprising $n_k-1$ serially connected IGFETs $G_k[i]$, i=1, 2, . . . ($n_k-1$);

wherein the integer set I=$\{n_0, n_1, \ldots n_K\}$ and K are such that:

$n_i \geq 1$, $$\sum_{k=0}^{K} n_k = N + 1,$$

$\exists n_i$ for which $n_i > 1$;

wherein for each k=0, 1, ... K; i=1, 2, ... ($n_k$-1), the drain of IGFET $G_k$[i] is connected to node $N_{I[k,i]}$, where I[k,i]=$I_k$[i], where $I_k$[i] is the $i^{th}$ element (counting from zero, left to right) of the ordered set of $n_k$ integers $$I_k = \{S_k, (S_k+1), \ldots (S_{k+1}-1)\},$$

where $S_k$, k=0, 1, ... K+1, are such that $$S_k = \sum_{j=0}^{k-1} n_j, \quad k > 0,$$

$$S_0 = 0;$$

wherein for each k=0, 1, ... K, the drain of IGFET H[k] is connected to node $N_{I[k,0]}$, and the source of IGFET H[k] is connected to the source of IGFET $G_k[n_k-1]$.

8. The priority encoder as set forth in claim 7, wherein the integer set I minimizes a cost function.

9. The priority encoder as set forth in claim 8, wherein the cost function is $$C(I) = \max \begin{bmatrix} (K+1), \{n_k, k = 0, 1, \ldots K\}, \\ \{(n_k - i + K - k), i = 1, 2, \ldots (n_k - 1); k = 0, 1, \ldots K\} \end{bmatrix}.$$

10. The priority encoder as set forth in claim 7, further comprising:

an output circuit to provide at least one voltage indicative of the leading zero of a binary N+1 bit word ($B_N B_{N-1} \ldots B_0$) if for each k=0, 1, ... K; i=1, 2, ... ($n_k$-1), the gate voltage of nMOSFET $G_k$[i] is indicative of $B_{I[k,i]}$;

for each k=0, 1, ... K, the gate voltage of nMOSFET H[k] is indicative of $A_k$, where $$A_k = \prod_{i \in I_k} B_i,$$

where product denotes logical AND.

11. The priority encoder as set forth in claim 7, further comprising:

an output circuit to provide at least one voltage indicative of the leading one of a binary N+1 bit word ($B_N B_{N-1} \ldots B_0$) if for each k=0, 1, ... K; i=1, 2, ... ($n_k$-1), the gate voltage of nMOSFET $G_k$[i] is indicative of $\overline{B}_{I[k,i]}$;

for each k=0, 1, ... K, the gate voltage of nMOSFET H[k] is indicative of $A_k$, where $$A_k = \prod_{i \in I_k} \overline{B}_i,$$

where product denotes logic AND.

12. The priority encoder as set forth in claim 7, further comprising:

N output circuits $C_i$, i=0, 1, ... (N-1), each having a first input having voltage $C_i[0]$ and a second input having voltage $C_i[1]$, each output circuit $C_i$ having its first input connected to node $N_i$ and its second input connected to node $N_{i+1}$ to provide an output voltage indicative of $C_i[0] \bullet \overline{C_{i[1]}}$ where $\bullet$ denotes logical AND and the over-bar denotes logical complement.

13. The priority encoder as set forth in claim 12, wherein the integer set I minimizes a cost function.

14. The priority encoder as set forth in claim 13, wherein the cost function is $$C(I) = \max \begin{bmatrix} (K+1), \{n_k, k = 0, 1, \ldots K\}, \\ \{(n_k - i + K - k), i = 1, 2, \ldots (n_k - 1); k = 0, 1, \ldots K\} \end{bmatrix}.$$

15. A priority encoder comprising:

a set $\{N_0, N_1, \ldots N_N\}$ of N+1 nodes;

K+1 transistors H[k], k=0, 1, ... K; and

K+1 groups $G_k$, k=0, 1 ... K, of transistors, each group $G_k$ comprising $n_k$-1 transistors $G_k$[i], i=1, 2, ... ($n_k$-1);

wherein the integer set I=$\{n_0, n_1, \ldots n_K\}$ and K are such that:

$$n_1 \geq 1,$$

$$\sum_{k=0}^{K} n_k = N + 1,$$

$\exists n_i$ for which $n_i > 1$;

wherein for each k=0, 1, ... K; i=1, 2, ... ($n_k$-1), the transistor $G_k$[i] is coupled to node $N_{I[k,i]}$ to pull down node $N_{I[k,i]}$ LOW if transistors $\{G_k[j], j=i, (i+1), \ldots (n_k-1)\}$ and $\{H[j], j=(k+1), (k+2), \ldots K\}$ are ON, where the latter set is null if k=K, where I[k,i]=$I_k$[i], where $I_k$[i] is the $i^{th}$ element (counting from zero, left to right) of the ordered set of $n_k$ integers $$I_k = \{S_k, (S_k+1), \ldots (S_{k+1}-1)\},$$

where $S_k$, k=0, 1, ... K+1, are such that $$S_k = \sum_{j=0}^{k-1} n_j, \quad k > 0,$$

$$S_0 = 0;$$

wherein for each k=0, 1, ... K, the transistor H[k] is coupled to node $N_{I[k,0]}$ to pull down node $N_{I[k,0]}$ LOW if transistors $\{H[j], j=k, (k+1), \ldots K\}$ are ON.

16. The priority encoder as set forth in claim 15, wherein the integer set I minimizes a cost function.

17. The priority encoder as set forth in claim 16, wherein the cost function is $$C(I) = \max \begin{bmatrix} (K+1), \{n_k, k = 0, 1, \cdots K\}, \\ \{(n_k - i + K - k), i = 1, 2, \cdots (n_k - 1); k = 0, 1, \cdots K\} \end{bmatrix}.$$

18. The priority encoder as set forth in claim 15, further comprising:

N output circuits $C_i$, i=0, 1, ... (N−1), each having a first input having voltage $C_i[0]$ and a second input having voltage $C_i[1]$, each output circuit $C_i$ having its first input coupled to node $N_i$ and its second input coupled to node $N_{i+1}$ to provide an output voltage indicative of $C_i[0] \cdot \overline{C_i[1]}$ where · denotes logical AND and the over-bar denotes logical complement.

19. The priority encoder as set forth in claim 18, wherein the integer set I minimizes a cost function.

20. The priority encoder as set forth in claim 19, wherein the cost function is $$C(I) = \max\left[\begin{array}{l}(K+1), \{n_k, k = 0, 1, \cdots K\}, \\ \{(n_k - i + K - k), i = 1, 2, \cdots (n_k - 1); k = 0, 1, \cdots K\}\end{array}\right].$$

21. The priority encoder as set forth in claim 15, further comprising:
an output circuit to provide at least one voltage indicative of the leading zero of a binary N+1 bit word ($B_N B_{N-1} \ldots B_0$) if
for each k=0, 1, ... K; i=1, 2, ... ($n_k$−1), transistor $G_k[i]$ is responsive to $B_{I[k,i]}$;
for each k=0, 1, ... K, transistor H[k] is responsive of $A_k$, where $$A_k = \prod_{i \in I_k} B_i,$$

where product denotes logical AND.

22. The priority encoder as set forth in claim 15, further comprising:
an output circuit to provide at least one voltage indicative of the leading one of a binary N+1 bit word ($B_N B_{N-1} \ldots B_0$) if
for each k=0, 1, ... K; i=1, 2, ... ($n_k$−1), transistor $G_k[i]$ is responsive of $B_{I[k,i]}$;
for each k=0, 1, ... K, transistor H[k] is responsive of $A_k$, where $$A_k = \prod_{i \in I_k} B_i,$$

where product denotes logical AND.

23. The priority encoder as set forth in claim 21, wherein the integer set I minimizes a cost function, where the cost function is $$C(I) = \max\left[\begin{array}{l}(K+1), \{n_k, k = 0, 1, \cdots K\}, \\ \{(n_k - i + K - k), i = 1, 2, \cdots (n_k - 1); k = 0, 1, \cdots K\}\end{array}\right].$$

24. The priority encoder as set forth in claim 22, wherein the integer set I minimizes a cost function, where the cost function is $$C(I) = \max\left[\begin{array}{l}(K+1), \{n_k, k = 0, 1, \cdots K\}, \\ \{(n_k - i + K - k), i = 1, 2, \cdots (n_k - 1); k = 0, 1, \cdots K\}\end{array}\right].$$

25. The priority encoder as set forth in claim 15, further comprising:
at least one clocked transistor to pull up all nodes in the set $\{N_0, N_1, \ldots N_N\}$ HIGH if a clock signal is in a first state, wherein, the transistors H[k], k=0, ... K, and $G_k[i]$, i=1, ... ($n_k$−1), k=0, 1, ... K, are coupled to the nodes to pull a subset of the nodes LOW based upon which of the transistors H[k], k=0, 1, ... K, and $G_k[i]$, i=1, ... ($n_k$−1), k=0, 1, ... K, are ON if the clock signal is in a second state complementary to the first state.

26. The priority encoder as set forth in claim 15, further comprising:
for each i=0, 1, ... N, at least one transistor coupled to node $N_i$ to pull up node $N_i$ HIGH if and only if transistors H[k], k=0, 1, ... K, and $G_k[i]$, i=1, ... ($n_k$−1), k=0, 1, ... K, are such as to not pull down node $N_i$ LOW.

27. A priority encoder to provide at least one voltage indicative of the leading zero or one of a binary word ($B_7 B_6 \ldots B_0$), the priority encoder comprising:
a by-pass stack of transistors to provide at least one voltage indicative of the logical AND of at least one subset of the Boolean values ($B_7 B_6 \ldots B_0$); and
a broken stack of transistors to provide at least voltage indicative of the logical AND of at least one proper subset of the Boolean values ($B_7 B_6 \ldots B_0$).

28. A priority encoder comprising:
a by-pass stack comprising first, second, and third nMOSFETs;
a broken stack of nMOSFETs comprising first, second, and third groups, wherein:
the first group comprises an nMOSFET having a source connected to the source of the first nMOSFET in the by-pass stack;
the second group comprises first and second nMOSFETs serially connected to each other, where the second nMOSFET in the second group has a source connected to the source of the second nMOSFET in the by-pass stack; and
the third group comprises first and second nMOSFETs serially connected to each other, where the second nMOSFET in the third group has a source connected to the source of the third nMOSFET in the by-pass stack.

* * * * *